(12) United States Patent
Kobayashi et al.

(10) Patent No.: US 8,081,309 B2
(45) Date of Patent: Dec. 20, 2011

(54) OPTICAL MICROSCOPE AND SPECTRUM MEASURING METHOD

(75) Inventors: Minoru Kobayashi, Osaka (JP); Taisuke Ota, Osaka (JP); Takahiro Ode, Kanagawa (JP)

(73) Assignee: Nanophoton Corp., Osaka, Osaka (JP)

( * ) Notice: Subject to any disclaimer, the term of this patent is extended or adjusted under 35 U.S.C. 154(b) by 0 days.

(21) Appl. No.: 12/591,584

(22) Filed: Nov. 24, 2009

(65) Prior Publication Data
US 2010/0128263 A1 May 27, 2010

(30) Foreign Application Priority Data

Nov. 27, 2008 (JP) ................... 2008-301820

(51) Int. Cl.
*G01J 3/30* (2006.01)
(52) U.S. Cl. ....................................... 356/318
(58) Field of Classification Search .................. 356/300; 359/368
See application file for complete search history.

(56) References Cited

U.S. PATENT DOCUMENTS

| | | | |
|---|---|---|---|
| 6,943,332 B2 | 9/2005 | Suzuki | |
| 7,561,265 B2 | 7/2009 | Kobayashi et al. | |
| 2003/0132394 A1* | 7/2003 | Wolleschensky et al. | 250/458.1 |
| 2010/0166293 A1* | 7/2010 | Sugita et al. | 382/154 |

FOREIGN PATENT DOCUMENTS

| | | |
|---|---|---|
| JP | 2002-14043 | 1/2002 |
| JP | 2003-344776 | 12/2003 |
| JP | 2007-179002 | 7/2007 |

OTHER PUBLICATIONS

Charlene A. Drumm, et al., "Microscopic Raman Line-Imaging With Principal Component Analysis" Applied Spectroscopy, 1995, vol. 49, Issue 9, pp. 1331-1337.

\* cited by examiner

*Primary Examiner* — Tarifur Chowdhury
*Assistant Examiner* — Abdullahi Nur
(74) *Attorney, Agent, or Firm* — McGinn IP Law Group, PLLC

(57) ABSTRACT

An optical microscope applies laser light to a sample through the an objective lens, detects reflected light reflected by the sample through the objective lens, changes a focal position of the laser light in an optical axis direction, extracts a focal position for spectrum measurement based on a detection result of the reflected light when the focal position of the laser light is changed, adjusts the focal position to coincide with the extracted focal position, separates outgoing light exiting from the sample by application of the laser light with the adjusted focal position from the laser light, and measures a spectrum of the outgoing light separated from the laser light with a spectroscope.

20 Claims, 7 Drawing Sheets

OPTICAL MICROSCOPE AND SPECTRUM MEASURING METHOD

BACKGROUND OF THE INVENTION

1. Field of the Invention

The present invention relates to an optical microscope and a spectrum measuring method and, particularly, to an optical microscope and a spectrum measuring method with use of a spectroscope for measuring a spectrum.

2. Description of Related Art

Raman spectroscopy is advantageous in that measurement can be executed on a sample in any of gaseous, liquid, crystalline and amorphous solid forms, irrespective of whether temperature is high or low, without using a special measurement atmosphere such as a vacuum atmosphere. In addition, the Raman spectroscopy is advantageous in that no particular pretreatment of a sample is needed, and the sample can be measured as it is. Therefore, measurement has been done in many ways utilizing such advantages. The application of the Raman spectroscopy enables observation of molecules without staining and observation of impurities in a semiconductor.

To carry out the Raman spectroscopy, a Raman microscope using a spectroscope is disclosed (Japanese Unexamined Patent Publication Nos. 2002-14043 and 2003-344776). The Raman microscope focuses laser light onto a sample. The Raman spectroscopy then disperses Raman scattered light from the sample with use of the spectroscope to thereby measure a Raman spectrum. Further, the Raman microscope executes measurement while moving the sample to thereby measure the spatial distribution of Raman scattered light intensity at a particular wavelength.

Another Raman microscope is disclosed that linearly illuminates a sample by use of a cylindrical lens for shortening measurement time and detects Raman scattered light with a CCD camera (CHARLENE A. DRUMM and another, "Microscopic Raman Line-Imaging With Principal Component Analysis" APPLIED SPECTROSCOPY, 1995, Volume 49, Issue 9, pp. 1331-1337). Because the Raman microscope illuminates a sample in a line form, it is possible to illuminate a large area at a time and thus shorten measurement time. However, in the case where light is changed into a linear form by the cylindrical lens, it is difficult to uniformly apply light, causing a peripheral area to be darkened.

Furthermore, an optical microscope is disclosed that deflects laser light and conducts scanning (Japanese Unexamined Patent Publication No. 2007-179002 (Kobayashi et. al.)). The optical microscope includes an X-directional scanning unit and a Y-directional scanning unit. A scanning period of the Y-directional scanning unit is set shorter than exposure time of a camera mounted on a spectroscope (cf. paragraph 0042). It is thereby possible to measure a Raman spectrum of a linear area in one frame of the camera.

As described above, the microscopes disclosed in Kobayashi et al. and CHARLENE A. DRUMM et al. use the spectroscope for measuring a Raman spectrum. However, in such Raman microscopes, reflected light is imaged through the spectroscope by use of a spectroscope camera, which raises the following issue. In the spectroscope camera, for which low noise is demanded, reading speed is slow. It is thus difficult to perform imaging at a high speed with the spectroscope camera. Accordingly, the imaging time is longer compared to a camera that images normal reflected light.

Further, if the surface of a sample is not flat, focus is sometimes made on a space where the sample does not exist. Specifically, in the case of using a sample with an uneven surface, a focal position can be at a position different from the sample surface in some cases. Therefore, when measuring a Raman spectrum from the sample surface at a desired point of the sample, it is necessary to perform spectrum measurement a plurality of times by moving the sample in the Z direction at each point. This causes the issue that measurement of a Raman spectrum takes long time.

As described above, the optical microscope according to related art has the issue that the measurement time is long when using a spectroscope for measuring a Raman spectrum.

The present invention has been accomplished to address the above issues, and an object of the invention is thus to provide an optical microscope and a spectrum measuring method that enable measurement of a spectrum in a short time even in the structure of using a spectroscope for measuring a spectrum.

SUMMARY OF THE INVENTION

A first aspect of an embodiment of the present invention is a spectrum measuring method that includes applying laser light to a sample through the an objective lens, detecting reflected light reflected by the sample through the objective lens, changing a focal position of the laser light in an optical axis direction, extracting a focal position for spectrum measurement based on a detection result of the reflected light when the focal position of the laser light is changed, adjusting the focal position to coincide with the extracted focal position, separating outgoing light from the laser light, the outgoing light exiting from the sample by application of the laser light with the adjusted focal position, and measuring a spectrum of the outgoing light separated from the laser light with a spectroscope. This enables reduction of the number of times of measuring a spectrum. It is thereby possible to shorten measurement time.

A second aspect of an embodiment of the present invention is the above-described spectrum measuring method that further includes sequentially detecting reflected light from a plurality of measurement positions on the sample by changing an incident position of the laser light with respect to the sample, extracting the focal position at each of the plurality of measurement positions and measuring a surface shape of the sample, and measuring the spectrum by conducting three-dimensional scanning with the laser light such that the focal position is moved along a surface of the sample. This enables measurement of a spectrum of the outgoing light on the sample surface. It is thereby possible to perform highly accurate measurement in short measurement time.

A third aspect of an embodiment of the present invention is the above-described spectrum measuring method that further includes measuring the spectrum by conducting three-dimensional scanning such that the focal position follows a surface of the sample based on a detection result of the reflected light. It is thereby possible to perform measurement in a shorter time.

A fourth aspect of an embodiment of the present invention is the above-described spectrum measuring method in which the separating the outgoing light from the laser light includes separating the outgoing light having a wavelength different from a wavelength of the laser light from the laser light by a first light splitting mechanism that separates light depending on a wavelength, and separating reflected light reflected by the sample by a second light splitting mechanism after separating the outgoing light from the laser light by the first light splitting mechanism, and the reflected light is detected through a confocal optical system by a photodetector and a reflected image of the reflected light from the sample is captured. It is thereby possible to simultaneously conduct capture of a reflected image and measurement of a spectrum.

A fifth aspect of an embodiment of the present invention is the above-described spectrum measuring method that further includes changing an incident position of the laser light with respect to the sample by a first scanning mechanism that conducts scanning with the laser light in a first direction, and changing an incident position of the laser light with respect to the sample by a second scanning mechanism that conducts scanning with the laser light in a second direction orthogonal to the first direction, in which the outgoing light from the sample is descanned by the first scanning mechanism and the second scanning mechanism and enters the spectroscope. The outgoing light thereby enters the same position of the spectroscope, thereby improving measurement accuracy.

A sixth aspect of an embodiment of the present invention is the above-described spectrum measuring method in which the first scanning mechanism and the second scanning mechanism include three scanners in total, and the outgoing light is descanned by two of the three scanners and not descanned by one of the three scanners. It is thereby possible to perform capture of a reflected image and measurement of a spectrum in a simple structure.

A seventh aspect of an embodiment of the present invention is an optical microscope that includes a laser light source, an objective lens that condenses light from the laser light source on a sample, a first light splitting mechanism that separates outgoing light from incident light incident on a sample from the laser light source, the outgoing light exiting from the sample toward the objective lens, a photodetector that detects reflected light reflected by the sample through the objective lens, a focal position changing mechanism that changes a focal position of the laser light along an optical axis, an extracting mechanism that extracts a focal position for spectrum measurement based on a detection result of the photodetector when the focal position is changed, and a spectroscope that measures a spectrum of the outgoing light separated by the first light splitting mechanism at the focal position extracted by the extracting mechanism. This enables reduction of the number of times of measuring a spectrum. It is thereby possible to shorten measurement time.

An eighth aspect of an embodiment of the present invention is the above-described optical microscope in which reflected light is sequentially detected from a plurality of measurement positions on the sample by changing an incident position of the laser light with respect to the sample, the focal position at each of the plurality of measurement positions is extracted, and a surface shape of the sample is measured, and the spectrum is measured by conducting three-dimensional scanning with the laser light such that the focal position is moved along a surface of the sample. This enables measurement of a spectrum of the outgoing light on the sample surface. It is thereby possible to perform highly accurate measurement in short measurement time.

A ninth aspect of an embodiment of the present invention is the above-described optical microscope that further includes an automatic focus mechanism that conducts scanning such that the focal position follows a surface of the sample based on a detection result of the reflected light, in which the spectrum measurement is performed following the surface of the sample by the automatic focus mechanism. This enables measurement of a spectrum of the outgoing light on the sample surface. It is thereby possible to perform highly accurate measurement in short measurement time.

A tenth aspect of an embodiment of the present invention is the above-described optical microscope that further includes a second light splitting mechanism that separates reflected light reflected by the sample from laser light incident on the sample after the first light splitting mechanism makes separation, in which the first light splitting mechanism acquires the outgoing light having a wavelength different from a wavelength of the laser light depending on a wavelength, and the photodetector detects the reflected light through a confocal optical system to thereby capture a reflected light image of the reflected light from the sample. It is thereby possible to simultaneously conduct capture of a reflected image and measurement of a spectrum.

An eleventh aspect of an embodiment of the present invention is the above-described optical microscope that further includes a first scanning mechanism that conducts scanning with the laser light in a first direction and changes an incident position of the laser light with respect to the sample, and a second scanning mechanism that conducts scanning with the laser light in a second direction orthogonal to the first direction and changes an incident position of the laser light with respect to the sample, in which the outgoing light from the sample is descanned by the first scanning mechanism and the second scanning mechanism and enters the spectroscope. The outgoing light thereby enters the same position of the spectroscope, thereby improving measurement accuracy.

A twelfth aspect of an embodiment of the present invention is the above-described optical microscope in which the first scanning mechanism and the second scanning mechanism include three scanners in total, and the outgoing light is descanned by two of the three scanners and not descanned by one of the three scanners. It is thereby possible to perform capture of a reflected image and measurement of a spectrum in a simple structure.

A thirteenth aspect of an embodiment of the present invention is an optical microscope that includes a laser light source, an objective lens that condenses light from the laser light source on a sample, a first light splitting mechanism that separates light depending on a wavelength and acquires outgoing light having a wavelength different from a wavelength of laser light from outgoing light exiting from the sample toward the objective lens, a spectroscope that measures a spectrum of the outgoing light separated by the first light splitting mechanism, a second light splitting mechanism that separates reflected light reflected by the sample from the laser light, and a photodetector that detects the reflected light reflected by the sample through a confocal optical system. It is thereby possible to simultaneously conduct capture of a reflected image and measurement of a spectrum.

According to the embodiments of the present invention described above, it is possible to provide an optical microscope and a spectrum measuring method that enable measurement of a spectrum in a short time even in the structure of using a spectroscope for measuring a spectrum.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Exemplary embodiments of the present invention will be described hereinbelow. The explanation provided hereinbelow merely illustrates embodiments of the present invention, and the present invention is not limited to the below-described embodiments. The description hereinbelow is appropriately shortened and simplified to clarify the explanation. A person skilled in the art will be able to easily change, add, or modify various elements of the below-described embodiments without departing from the scope of the present invention. In the figures, the identical reference symbols denote identical structural elements and the redundant explanation thereof is omitted.

First Embodiment

Figure 1:
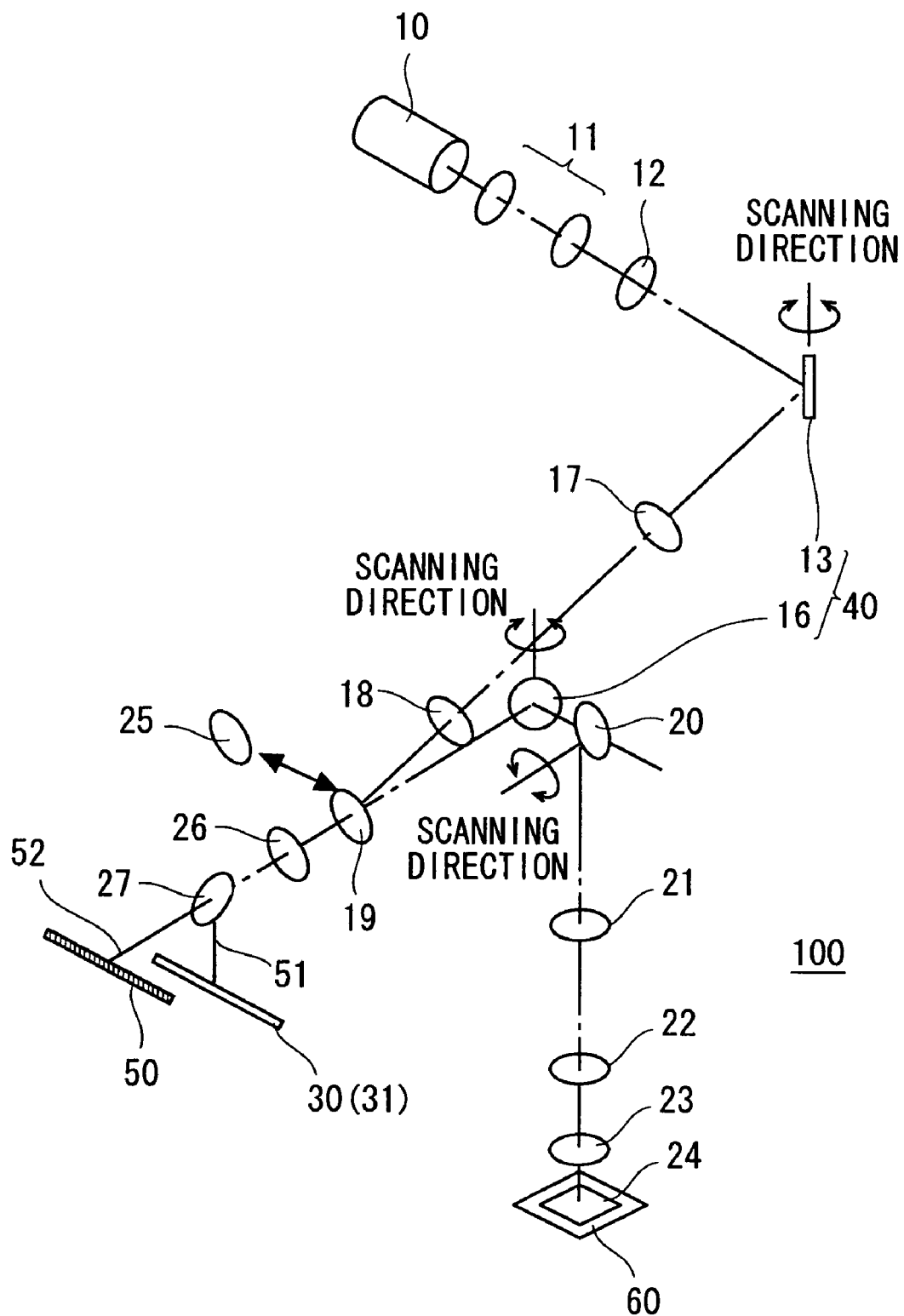
FIG. 1 is a view showing the structure of an optical microscope according to a first embodiment of the present invention.

An optical microscope according to a first embodiment of the present invention is described hereinafter with reference to FIG. 1. FIG. 1 is a view schematically showing the structure of an optical system of an optical microscope 100 according to the embodiment. The optical microscope 100 includes a laser light source 10, a beam expander 11, a laser line filter 12, a Y-directional scanning unit 40, a relay lens 17, a relay lens 18, an edge filter 19, an X-directional scanning unit 20, a relay lens 21, a tube lens 22, an objective lens 23, a half mirror 25, a focusing lens 26, a switching mirror 27, a spectroscope 31, a line CCD camera 50 and a stage 60, as a structure for observing a sample 24.

The optical microscope 100 is a Raman microscope. The optical microscope 100 allows a light beam from the laser light source 10 to enter the sample 24 and detects Raman scattered light from the sample 24 with the spectroscope 31. The spectroscope 31 disperses the Raman scattered light, thereby measuring a Raman spectrum. Further, the optical microscope 100 enables scanning in the XY direction (horizontal direction) and the Z direction (vertical direction), thereby measuring a three-dimensional Raman spectrum image. Furthermore, the optical microscope 100 includes the line CCD camera 50 for capturing a reflected image through a confocal optical system. Thus, reflected light reflected by the sample 24 is detected through a line confocal optical system. The optical system for conducting spectrum measurement of Raman scattered light and the optical system for capturing reflected image can be switched. Specifically, the optical system for conducting spectrum measurement of Raman scattered light and the optical system for capturing reflected image have a partly common optical path and switched by the switching mirror 27.

The overall structure of the optical microscope 100 is described hereinbelow. First, an illumination optical system when measuring a Raman spectrum is described. In the illumination optical system, the laser light source 10 emits laser light as excitation light. The laser light source 10 emits light with a predetermined laser wavelength. For example, the laser light source 10 emits monochromatic light such as red or green light. As the laser light source 10, Millennia available from Spectra Physics, Inc. may be used. The laser light source 10 is a Nd/YVO4 laser with a laser wavelength of 532 nm, a laser linewidth of 0.24 nm and the maximum power of 10 W. The laser light source 10 emits laser light having such a laser wavelength.

The laser light is expanded by the beam expander 11. Specifically, the beam expander 11 expands a beam diameter in such a way that a laser light spot becomes a predetermined size. After that, the laser light enters the laser line filter 12. The laser line filter 12 blocks light outside the laser wavelength. This reduces stray light causing noise. The laser light then passes through the laser line filter 12 and enters a high-speed scanner 13.

The high-speed scanner 13 and a low-speed scanner 16, which is placed in the subsequent stage of the edge filter 19, constitute the Y-directional scanning unit 40. The Y-directional scanning unit 40 thus includes the high-speed scanner 13 and the low-speed scanner 16. The Y-directional scanning unit 40 deflects the laser light in the Y direction and conducts scanning. Specifically, the Y-directional scanning unit 40 changes an output angle of the incident light beam to deflect the light beam. Accordingly, an incident position of the light beam on the sample 24 is changed along the Y direction. The high-speed scanner 13 is a resonant galvanometer mirror, for example, and moves the laser light at about 8 kHz. The direction of the laser light changes by a change in an angle of a reflection plane of the galvanometer mirror. The low-speed scanner 16 is a servo galvanometer mirror, for example, and operates at a lower speed than the high-speed scanner 13. The laser light is thereby moved for scanning. The high-speed scanner 13 and the low-speed scanner 16 conduct scanning with the laser light in the Y direction. The operation of the Y-directional scanning unit 40 is described later.

The relay lenses 17 and 18 and the edge filter 19 are placed between the high-speed scanner 13 and the low-speed scanner 16. The relay lenses 17 and 18 refract the laser light and relay the image. A diaphragm may be placed between the relay lens 17 and the relay lens 18. The laser light from the relay lens 18 then enters the edge filter 19.

The edge filter 19 reflects or transmits light depending on a wavelength. Thus, the edge filter 19 has transmittance and reflectance according to a wavelength. Specifically, the edge filter 19 reflects light with the laser wavelength and transmits light with a longer wavelength than the laser wavelength. This enables efficient measurement of Raman scattered light. Consequently, most of the laser light serving as excitation light is reflected by the edge filter 19 and headed to the sample 24. On the other hand, most of the Raman scattered light having a longer wavelength than the laser light is transmitted through the edge filter 19 and headed to the spectroscope 31. As the edge filter 19, an edge filter available from Semrock Inc. is used in this example.

The laser light reflected by the edge filter 19 enters the low-speed scanner 16. The low-speed scanner 16 is a galvano mirror as described above and moves the laser light in the Y direction. The laser light reflected by the low-speed scanner 16 enters the X-directional scanning unit 20. The X-directional scanning unit 20 is a servo galvano mirror, for example. The X-directional scanning unit 20 deflects the light beam by changing an angle of a reflection plane thereof. That is, an angle of the reflection plane of the X-directional scanning mirror 20 with respect to the optical axis is changed, so that an output angle of the light beam can be changed. As a result, an incident position of the light beam on the sample 24 is changed along the X direction. Hence, the light beam can be moved in the X direction on the sample 24. Incidentally, an angle of deflection of the light beam in the X-directional scanning mirror 20 is controlled in accordance with electric signals. The X direction and the Y direction are orthogonal to each other. Thus, the X-directional scanning mirror 20 and the Y-directional scanning unit 40 scan the sample in the XY direction, so that a two-dimensional area can be scanned on the sample 24.

The laser light reflected by the X-directional scanning unit 20 is refracted by the relay lens 21 and the tube lens 22 and then enters the objective lens 23. The objective lens 23 condenses the light beam and applies the beam onto the sample 24. The objective lens 23 thus focuses the light beam on the sample 24 to illuminate the sample 24. A spot-like area of the sample 24 is thereby illuminated. As the objective lens 23, Apochromat with NA 1.2×60 available from Nikon Corporation may be used, for example.

The objective lens 23 condenses the light beam and makes the light beam incident on the sample 24. The laser light is moved in the XY direction by the X-directional scanning mirror 20 and the Y-directional scanning unit 40. Thus, an incident position of the laser light on the sample 24 is changed according to the operation of the X-directional scanning mirror 20 and the Y-directional scanning unit 40. A two-dimensional area can be thereby scanned on the sample 24.

The light incident on the sample 24 from the objective lens 23 is reflected by the sample 24. Further, part of the light incident on the sample 24 is Raman-scattered. Out of the light incident on the sample 24, light emitted toward the objective lens 23 is referred to as outgoing light. Thus, the light headed from the sample 24 to the objective lens 23 is the outgoing light. The outgoing light contains reflected light (Rayleigh scattered light) having the same wavelength as the laser wavelength and Raman scattered light having a different wavelength from the laser wavelength. If the sample 24 contains a fluorescent material, the outgoing light contains fluorescence.

The Raman-scattered outgoing light is different in wavelength from the incident light. The outgoing light is scattered with a frequency that deviates from a frequency of the incident light by Raman shift. A spectrum of the outgoing light is a Raman spectrum. Therefore, if the spectrum of the outgoing light is measured, the chemical structure and the physical state of substances contained in the sample 24 can be determined. Because the Raman spectrum includes vibrational spectroscopic information about the substances of the sample 24, if the outgoing light is dispersed and detected by the spectroscope 31, substances in the sample 24 can be identified. Focusing on a specific wavelength out of the measured Raman spectrum, the spatial distribution of a specific substance can be measured. To be specific, if the sample 24 is a living cell, the spatial distribution of nucleic acids or lipids, or the spatial distribution of sucrose or polystyrene sphere can be measured.

The sample 24 is placed on top of the stage 60. The stage 60 is an XYZ stage, for example. The stage 60 is a movable stage to thereby illuminate a desired position of the sample 24. Further, by driving the stage 60 in the Z direction, a distance between the objective lens 23 and the sample 24 can be changed. Accordingly, the focal position of the objective lens 23 can be changed along the optical axis direction. The optical microscope 100 constitutes a laser confocal microscope as described below, and Z-directional scanning is realized by changing the focal position. Thus, by moving the stage 60 in the Z direction, a tomographic image of the sample 24 can be taken. Further, Raman scattered light from a given height of the sample 24 can be detected.

Next, an optical system for detecting the outgoing light from the sample 24 is described hereinafter. The outgoing light from the sample 24 placed on top of the stage 60 propagates through the same optical path as that for the incident light. Thus, the outgoing light is refracted by the objective lens 23, further refracted by the tube lens 22 and the relay lens 21, and then enters the X-directional scanning unit 20. The X-directional scanning unit 20 reflects the incident outgoing light toward the edge filter 19. At this time, the outgoing light is descanned by the X-directional scanning unit 20. That is, the outgoing light is reflected by the X-directional scanning unit 20 and propagates in a direction opposite to a traveling direction of the incident light from the laser light source 10 that is incident on the sample 24 through the X-directional scanning unit 20. Further, the reflected light from the sample 24 propagates through the same optical path as that for the Raman scattered light.

The outgoing light reflected by the X-directional scanning unit 20 enters the edge filter 19 through the low-speed scanner 16. The edge filter 19 separates the outgoing light from the sample 24 from the incident light emitted from the laser light source 10 to the sample 24 based on a difference in wavelength. Specifically, the edge filter 19 is set with its reflection plane inclined with respect to the optical axis of the incident light. The outgoing light from the sample 24 is transmitted through the edge filter 19, so the optical axis of the outgoing light from the sample 24 is different from the optical axis of the incident light emitted from the laser light source 10 to the sample 24. Hence, the outgoing light from the sample 24 can be separated from the incident light emitted from the laser light source 10 to the sample 24. In this manner, the edge filter 19 functions as a first light splitting mechanism that allows the incident light and the outgoing light to be separated form each other.

The edge filter 19, which is used as a light splitting mechanism, transmits or reflects light depending on a wavelength. An incident angle of the optical beam with respect to the edge filter 19 is preferably small. The incident angle of the light beam is an angle between the principle ray of the light beam and the normal to the reflection plane of the edge filter 19. The incident angle of the light beam from the relay lens 18 with respect to the reflection plane of the edge filter 19 is preferably 12° or smaller and more preferably 10°, for example. In this manner, the light beam is incident in a direction close to the vertical direction to the edge filter 19. Further, it is preferred to set the incident angle to 8° or larger such that an optical path does not coincide with that of the relay lens 18. However, the incident angle may be 8° or smaller under a certain design condition. The characteristics of the edge filter 19 can be thereby improved, making sure to split light into the reflected light and the Raman scattered light. This improves reflectance of the edge filter 19 for the reflected light and transmittance of the edge filter 19 for the Raman scattered light. Accordingly, the reflected light and the Raman scattered light can be securely separated from each other based on a difference in wavelength between the reflected light and the Raman scattered light. In the optical microscope according to the embodiments of the present invention, the incident angle of the light beam with respect to the edge filter 19 is not limited to the above value.

Further, the edge filter 19 has characteristics of reflecting the light having the laser wavelength and transmitting the Raman scattered light. Accordingly, the reflected light from the sample 24 is reflected by the edge filter 19, and the Raman scattered light is transmitted through the edge filter 19. Therefore, with use of the edge filter 19, the reflected light can be removed based on a difference in wavelength between the reflected light and the Raman scattered light. Further, most of the laser light from the laser light source 10 is reflected by the edge filter 19 toward the sample 24. This reduces a loss of the laser light, thereby efficiently detecting only the Raman scattered light. Reflection characteristics of the edge filter 19 may be determined in accordance with a range of a spectrum to be measured.

The edge filter 19 is placed between the low-speed scanner 16 and the high-speed scanner 13. When measuring a Raman spectrum, the high-speed scanner 13 is set stationary, and scanning is performed by use of only the low-speed scanner 16. Thus, only the low-speed scanner 16 in an operating state while the high-speed scanner 13 is kept in a non-operating state. The edge filter 19 thereby separates the outgoing light after being descanned by the low-speed scanner 16 from the laser light emitted from the laser light source 10.

The outgoing light transmitted through the edge filter 19 enters the focusing lens 26. The focusing lens 26 focuses the image of the sample 24 on an entrance slit 30 or the line CCD camera 50. Further, the outgoing light refracted by the focusing lens 26 is reflected by the switching mirror 27 and enters the entrance slit 30 placed on the incident side of the spectroscope 31. At this time, the focusing lens 26 focuses the outgoing light on the entrance slit 30. Specifically, the focusing lens 26 forms an enlarged image of an illuminated area of the sample 24 on the entrance slit 30. The entrance slit 30 has a linear opening. The opening extends along a direction corresponding to the Y direction. Thus, the opening of the entrance slit 30 extends along a direction corresponding to a scanning direction of the Y-directional scanning unit 40 (Y direction) on the sample 24.

The focusing lens 26 refracts the outgoing light and forms an image on the entrance slit 30. Because the incident light is focused into a spot-like image on the surface of the sample 24, the outgoing light is condensed into a spot shape on the entrance slit 30. The direction in which the opening of the entrance slit 30 extends coincides with the scanning direction of the Y-directional scanning unit 40. The outgoing light is descanned by the low-speed scanner 16 of the Y-directional scanning unit 40 and enters the edge filter 19. Therefore, in spite of scanning by the low-speed scanner 16, the light beam is incident on the entrance slit 30 such that a spot position of the light beam falls at the same position of the entrance slit 30. The entrance slit 30 is disposed in such a way that the light moved in the Y direction on the sample 24 is focused on the opening of the entrance slit 30. In other words, the entrance slit 30 and the sample 24 are in a conjugated relation.

Therefore, the Raman microscope is configured as a confocal optical system. For example, a diaphragm (not shown) and the surface of the sample 24 are arranged to establish a conjugated relation, and the surface of the sample 24 and the entrance slit 30 are arranged to establish a conjugated relation. The incident light is condensed into a spot shape on the XY plane where the diaphragm is placed and on the surface of the sample 24. Then, the scattered outgoing light that exits from the sample 24 is condensed into a spot shape on the entrance slit 30. The entrance slit 30 has an opening extending along the Y direction and allows only the outgoing light entering the opening to pass through toward a two-dimensional array photodetector. The illumination optical system from the laser light source 10 to the sample 24 and the observation optical system from the sample 24 to the array photodetector are configured as the imaging optical system as described above, thereby completing a confocal Raman microscope. This enables measurement with high resolution in the Z direction. By moving the stage 60 in the Z direction, the Raman scattered light from a desired height of the sample 24 can be separated from the Raman scattered light from the other heights thereof and detected.

Figure 2:
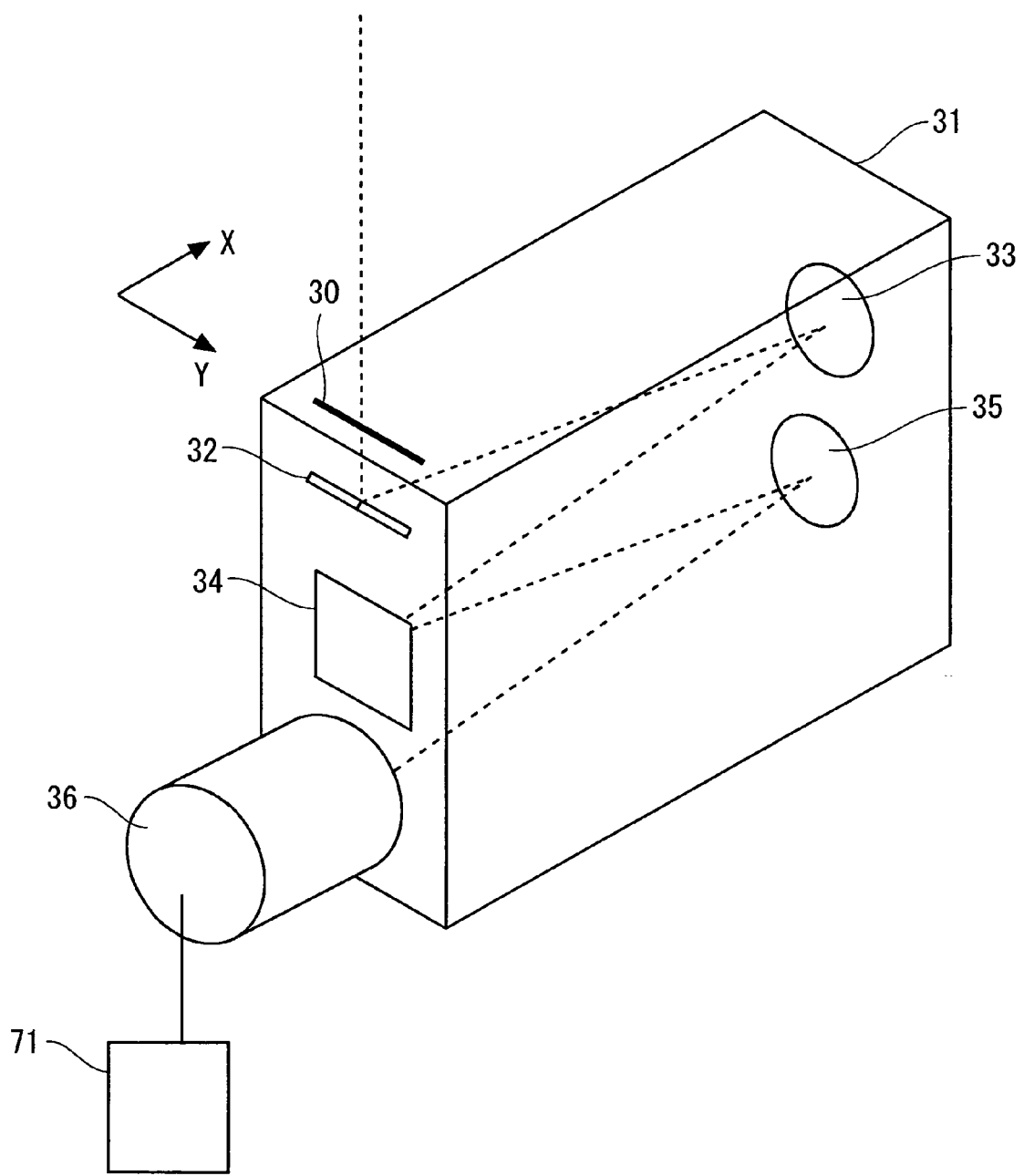
FIG. 2 is a perspective view schematically showing the structure of a spectroscope used for an optical microscope.

The outgoing light having passed through the entrance slit 30 enters a main body of the spectroscope 31. The spectroscope 31 is described hereinafter with reference to FIG. 2. FIG. 2 is a view showing the structure of the spectroscope 31. In this example, a Czerny-Turner spectroscope is shown as the spectroscope 31. The spectroscope 31 includes the entrance slit 30, a mirror 32, a concave mirror 33, a grating 34, a concave mirror 35 and an array photodetector 36.

The entrance slit 30 is placed on the incident side of the spectroscope 31. The entrance slit 30 extends along the Y direction. The outgoing light having passed through the entrance slit 30 is reflected by the mirror 32 and the concave mirror 33 and then enters the grating 34. The grating 34 spatially disperses the incident light from the entrance slit 30 in accordance with its wavelength. In this example, a reflective grating is used as the grating 34. The grating 34 disperses the outgoing light in a direction perpendicular to the longitudinal direction of the entrance slit 30. The light dispersed by the grating 34 is reflected by the concave mirror 35 and enters the array photodetector 36.

The spectroscope 31 may have a structure different from the above-described structure. The outgoing light is dispersed by the spectroscope 31 in a direction perpendicular to the longitudinal direction of the entrance slit 30. Thus, the spectroscope 31 executes wavelength dispersion of the outgoing light in a direction perpendicular to the linear opening of the entrance slit 30. The outgoing light dispersed by the spectroscope 31 enters the array photodetector 36. The array photodetector 36 is an area sensor in which light receiving devices are arranged in matrix. Specifically, the array photodetector 36 is a two-dimensional array photodetector having arrayed pixels such as a CCD camera.

The array photodetector 36 may be a cooling CCD, for example. Specifically, 1024×256-pixel thermoelectric cooling CCD available from Princeton Instruments, Inc. may be used as the array photodetector 36. Further, an image intensifier may be attached to the array photodetector 36. Pixels of the array photodetector 36 are arranged along a direction corresponding to the entrance slit 30. Hence, one arrangement direction of the pixels of the array photodetector 36 corresponds to the direction of the entrance slit 30, and the other arrangement direction corresponds to the dispersion direction of the spectroscope 31. The direction of the array photodetector 36 corresponding to the longitudinal direction of the entrance slit 30 is the Y direction, and the direction perpendicular to the entrance slit 30, which is the direction in which the outgoing light is dispersed by the spectroscope 31, is the X direction.

The array photodetector 36 outputs a detection signal corresponding to the intensity of the outgoing light received by each pixel to a processor 71. The processor 71 is an information processing unit such as a personal computer (PC), for example. The processor 71 stores the detection signal from the array photodetector 36 in memory or the like. Then, the processor 71 executes predetermined processing on the detection result and displays the result on a monitor. Further, the processor 71 controls the scanning by the Y-directional scanning unit 40 and the X-directional scanning mirror 20 and the driving of the stage 60. The X direction of the array photodetector 36 corresponds to the wavelength (frequency) of the outgoing light. Specifically, a pixel in one end of a pixel line in the X direction detects outgoing light with a long wavelength (low frequency), and a pixel in the other end detects outgoing light with a short wavelength (high frequency). In this way, the distribution of the light intensity in the X direction of the array photodetector 36 is a Raman spectrum distribution.

Now, an optical system for capturing a reflected image of reflected light is described hereinafter with reference to FIG. 1. In the case of capturing a reflected image, the edge filter 19 is removed from the optical path. Then, the half mirror 25 is inserted into the place where the edge filter 19 has been inserted. Thus, the edge filter 19 and the half mirror 25 are mounted in a detachable manner, and either one of them is inserted into the optical path. The edge filter 19 and the half mirror 25 are used exclusively against each other. The half mirror 25 is used when detecting reflected light with the same wavelength as the laser wavelength, and the edge filter 19 is used when detecting Raman scattered light. Further, when detecting reflected light with the same wavelength as the laser wavelength, the switching mirror 27 is removed from the optical path. Then, the high-speed scanner 13 operates for scanning and the low-speed scanner 16 is set stationary. Thus, only the high-speed scanner 13 is in an operating state while the low-speed scanner 16 is kept in a non-operating state. The other structure is the same as that when detecting Raman scattered light and not redundantly described.

The laser light from the laser line filter 12 is moved by the high-speed scanner 13. The laser light then enters the relay lens 17 and the relay lens 18 as described above. The laser light from the relay lens 18 enters the half mirror 25. The half mirror 25 partly reflects and partly transmits the incident light. In this example, almost half of the laser light incident on the half mirror 25 is reflected toward the low-speed scanner 16. The laser light reflected by the half mirror 25 enters the X-directional scanning unit 20 through the low-speed scanner 16 set stationary. The laser light is then incident on the sample 24 in the same manner as when detecting Raman scattered light. The outgoing light from the sample 24 is descanned by the X-directional scanning unit 20 in the same manner. The outgoing light from the X-directional scanning unit 20 then enters the half mirror 25 through the low-speed scanner 16 set stationary. The half mirror 25 transmits almost half of the outgoing light toward the focusing lens 26. The half mirror 25 has constant transmittance and reflectance regardless of a wavelength. Therefore, although part of Raman scattered light is transmitted through the half mirror 25, it causes no problem in taking a reflected image because the Raman scattered light is sufficiently lower than the reflected light.

The outgoing light transmitted through the half mirror 25 is refracted by the focusing lens 26 and headed to the line CCD camera 50. At this time, the switching mirror 27 is taken away from the optical path. Therefore, the outgoing light is headed toward the line CCD camera 50 without being reflected toward the spectroscope 31. The focusing lens 26 focuses the outgoing light on the light receiving surface of the line CCD camera 50. The line CCD camera 50 has light receiving pixels arranged along a direction corresponding to the Y direction.

The Y-directional scanning unit 40 sweeps the light beam in the Y direction one or more times during a period of capturing an image of one frame. Specifically, a scanning period of the Y-directional scanning unit 40 is set shorter than exposure time, and scanning is made in the Y direction one or more times within the exposure time for one frame of the line CCD camera 50. The reflected light in a linear area corresponding to the scanning range can be thereby detected in one frame of the line CCD camera 50. Specifically, the entire scanning area of the Y-directional scanning unit 40 is scanned within the exposure time. As a result, the reflected light is detected through a line confocal (slit confocal) optical system. After the imaging of one frame ends, the X-directional scanning unit 20 shifts the illumination position by one illumination area in the X direction. Then, an image of one frame is captured in the same manner to thereby detect the reflected light in a linear area. By repeating such processing, a reflected image of a two-dimensional area on the sample 24 can be captured. A detection signal by the line CCD camera 50 is output to the processor 71. As a result of processing in the processor 71, a reflected light image (reflected image) is obtained.

The line CCD camera 50 has a higher reading speed than the array photodetector 36. This allows the reflected image to be taken at a higher speed, thereby shortening the imaging time. Further, the outgoing light enters the line CCD camera 50 without through the spectroscope 31. This prevents the image from being affected by aberration of the spectroscope, thereby enabling imaging with high resolution. It is thereby possible to take the reflected image at a high speed and with high resolution even in the optical microscope 100 capable of measuring a Raman spectrum. Further, because scanning is conducted at a high speed in the Y direction, light becomes linear within the exposure time of the line CCD camera 50. Thus, taking the exposure time of the line CCD camera 50 into account, the sample 24 is illuminated linearly.

In this embodiment, the switching mirror 27 is mounted as a switching mechanism for switching the optical path of the outgoing light. The switching mirror 27 is mounted in a detachable manner in the optical path of the outgoing light. When the switching mirror 27 is inserted in the optical path, the outgoing light is reflected toward the spectroscope 31. On the other hand, when the switching mirror 27 is removed from the optical path, the outgoing light travels straight through the insertion position of the switching mirror 27 toward the line CCD camera 50. In this manner, it is possible to switch between measurement of a Raman spectrum and capture of a reflected image by inserting or removing the switching mirror 27. It is of course feasible to capture a reflected image when the switching mirror 27 is inserted. In this case, the switching mirror 27 is removed from the optical path during spectrum measurement. By activating the switching mirror 27, it is possible to make selection between measurement by the spectroscope 31 and measurement by the line CCD camera 50. The switching mirror 27 switches the optical path such that the outgoing light separated from the incident light propagates through an optical path 51 toward the spectroscope 31 or an optical path 52 toward the line CCD camera 50. A switching mechanism for switching the optical path is not limited to the switching mirror 27. For example, it may be a prism that refracts light.

The Y-directional scanning unit 40 is described hereinbelow. In this embodiment, the high-speed scanner 13 and the low-speed scanner 16 are mounted as the Y-directional scanning unit 40 that conducts scanning in the Y direction. Either one scanner is driven according to applications. The high-speed scanner 13 is a resonant galvanometer mirror, for example, and operates with a frequency of about 8 kHz.

The low-speed scanner 16 is a servo galvanometer mirror, for example, and operates with a lower frequency than the high-speed scanner 13. The high-speed scanner 13 thus moves laser light at a higher speed than the low-speed scanner 16. In the case where either one scanner is enough, the Y-directional scanning unit 40 may be made up of either one scanner only.

In the case of Raman mode for detecting Raman scattered light, for example, the high-speed scanner 13 is set in a stationary state and the low-speed scanner 16 is set in an operating state. At this time, the array photodetector 36 and the low-speed scanner 16 are synchronized with each other. In the Raman mode, the X-directional scanning unit 20 also operates in synchronization. Specifically, when spectrum measurement at a certain measurement position ends, the laser light is moved so that the laser light is incident on the next measurement position. At this time, the half mirror 25 is removed from the optical path, and the edge filter 19 is inserted in the optical path. The switching mirror 27 is also inserted in the optical path. Spectrometry can be thereby conducted by the spectroscope 31.

In the Raman mode, the light is descanned by the X-directional scanning unit 20 and the low-speed scanner 16 and enters the spectroscope 31. Thus, the light is incident on the same position of the entrance slit 30 of the spectroscope 31 during scanning in the XY direction. Accordingly, the light passes through the same point of the entrance slit 30 regardless of the measurement position on the sample. It is thereby possible to improve the accuracy of measuring a spectrum.

On the other hand, the exposure time of the line CCD camera 50 is shorter than the exposure time of the array photodetector 36. Thus, in the case of reflection mode for detecting reflected light having the same wavelength as laser light, the high-speed scanner 13 is set in an operating state and the low-speed scanner 16 is set in a stationary state. The laser light is thereby swept one or more times in the Y direction in the exposure time of the line CCD camera 50. In the reflection mode, the X-directional scanning unit 20 is also in operation. At this time, the edge filter 19 is removed from the optical axis, and the half mirror 25 is inserted in the optical axis. Further, the switching mirror 27 is removed from the optical axis. Reflected light can be thereby detected by the line CCD camera 50. Because the exposure time of the line CCD camera 50 is shorter than the exposure time of the array photodetector 36, it is preferred to conduct scanning by the high-speed scanner 13.

Further, in the case of observing a specific position of the sample 24, the laser light is applied to the specific position by the low-speed scanner 16 capable of position control. Then, scanning with the laser light is stopped, so that the illumination position is fixed at the position. At this time, the high-speed scanner 13 stops operating. A change in the image at the specific position can be thereby observed. In this way, if the positioning accuracy is needed, the illumination position of the laser light is moved by using only the low-speed scanner 16. Thus, the low-speed scanner 16 is used for positioning in order to illuminate the specific position. The illumination position of the laser light is thereby fixed at the specific position. On the other hand, the high-speed scanner 13 is used when detecting reflected light. In the case where one scanner is enough, scanning may be conducted in the Y direction with use of one scanner only. In this manner, the low-speed scanner 16 and the high-speed scanner 13 are mounted as a scanning mechanism for scanning in the Y direction. The two scanners are selectively used according to applications.

In this embodiment, two scanners, i.e. the high-speed scanner 13 and the low-speed scanner 16, are used in combination as a Y-directional scanning mechanism. In this structure, even in the case of using a scanner incapable of stopping at a specific angle, such as a resonant galvanometer mirror, as the high-speed scanner 13, for example, it is possible to measure a specific position on a sample by use of the low-speed scanner 16. In this manner, the X-directional scanning unit 20 and the Y-directional scanning unit 40 have three scanners in total (the Y-directional high-speed scanner 13, the Y-directional low-speed scanner 16 and the X-directional scanner). Descanning is performed in two of those scanners and not performed in one of them. It is thereby possible to achieve capture of a reflected image and measurement of a spectrum in a simple structure.

In the case of measuring a specific position on a sample, the accuracy of measurement is often more important than the speed of measurement. In this embodiment, the low-speed scanner 16 is placed closer to the sample than the edge filter 19 (or the half mirror 25) is. Thus, at the time of scanning with the low-speed scanner 16, light from the sample is detected by the line CCD camera 50 or the array photodetector 36 after being descanned. Accordingly, the light passes through the same point of the entrance slit 30 regardless of a measurement position on the sample, thereby enabling improvement in the accuracy of spectrum measurement.

On the other hand, the high-speed scanner 13 is placed closer to the laser light source 10 than the edge filter 19 (or the half mirror 25) is. Thus, at the time of scanning with the high-speed scanner 13, light from the sample is detected by the line CCD camera 50 or the array photodetector 36 without being descanned. Accordingly, a plurality of points in a linear area can be measured at a time, thereby enabling high-speed measurement.

In this manner, two scanners, i.e. the high-speed scanner 13 and the low-speed scanner 16, are used in combination as the Y-directional scanning mechanism, and only one of them is used for descanning. This allows selection between measurement with improved spectrum measuring accuracy and measurement at a high speed.

Further, in this structure, fluorescence can be detected. In the case of fluorescence mode for detecting fluorescence, the high-speed scanner 13 is set in operation and the low-speed scanner 16 is set stationary. In the fluorescence mode, the X-directional scanning unit 20 is also in operation. At this time, the half mirror 25 is removed from the optical path, and the edge filter 19 is inserted in the optical path. Excitation light can be thereby separated from the fluorescence. Thus, the fluorescence with a wavelength different from the laser wavelength is transmitted through the edge filter 19, and the laser light is reflected by the edge filter 19. Further, the switching mirror 27 is removed from the optical path. A fluorescence image can be thereby acquired by the line CCD camera 50. In this manner, the fluorescence mode, the reflection mode and the Raman mode can be readily switched. Further, by using the edge filter 19 and the half mirror 25 exclusively against each other, the need for mounting a bandpass filter or the like is eliminated. This enables simplification of a device structure.

Figure 3:
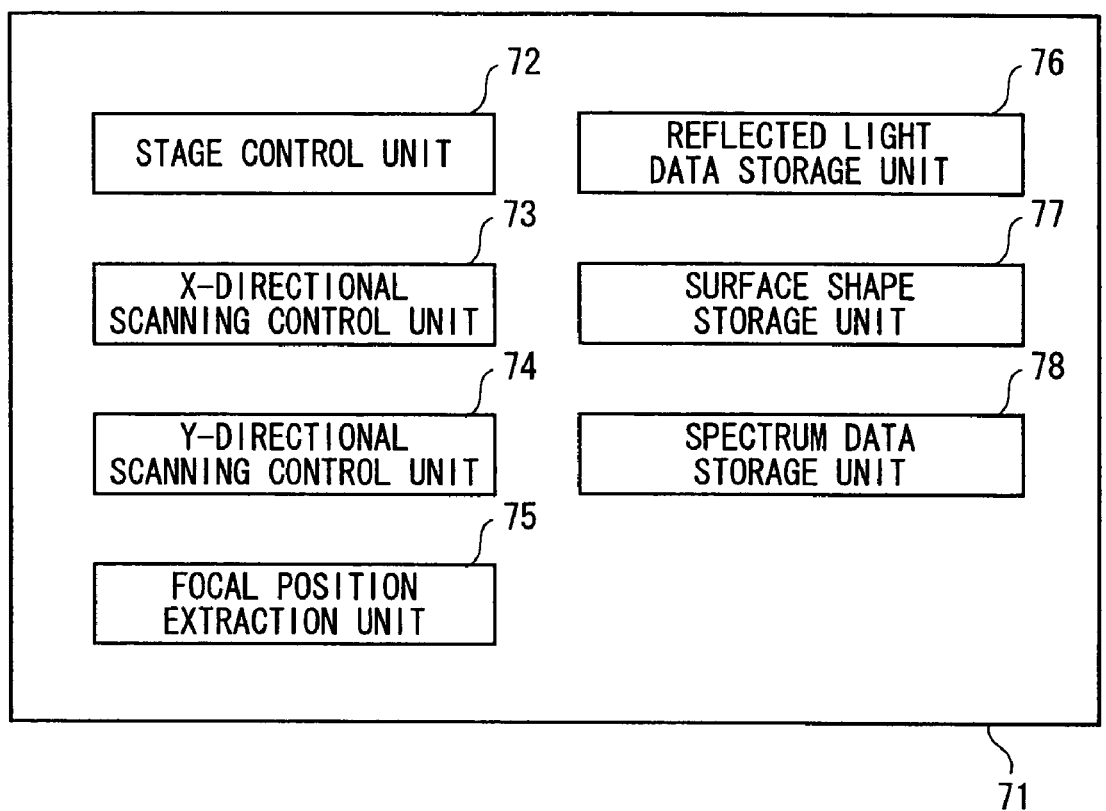
FIG. 3 is a block diagram showing the structure of a processor used for an optical microscope.

In this embodiment, the laser light is moved along the surface of a sample. The measurement time of a Raman spectrum can be thereby shortened. Specifically, assuming that a measurement point in the Z direction is one point, the number of measurement points for Raman spectrum measurement is reduced. The measurement time can be thereby shortened. Control and processing therefor are described hereinafter with reference to FIG. 3. FIG. 3 is a block diagram schematically showing the structure of the processor 71 used in the optical microscope according to the embodiment. Referring to FIG. 3, the processor 71 includes a stage control unit 72, an X-directional scanning control unit 73, a Y-directional scanning control unit 74, a focal position extraction unit 75, a reflected light data storage unit 76, a surface shape storage unit 77, and a spectrum data storage unit 78.

The stage control unit 72 controls the operation of the stage 60. The stage 60 is an XYZ stage and moves the sample 24 three-dimensionally. The sample 24 can be thereby moved to a desired position. The stage control unit 72 recognizes the three-dimensional coordinates of the stage 60. If the stage control unit 72 moves the stage 60 in the Z direction, a distance between the objective lens 23 and the sample 24 is changed. Accordingly, a focal position of the laser light on the sample 24 is changed along the optical axis. In this way, the Z coordinate of the stage 60 indicates a focal position of the laser light.

The X-directional scanning control unit 73 controls scanning by the X-directional scanning unit 20. Thus, a deflection angle of the laser light in the X direction is controlled by the X-directional scanning control unit 73. The X-directional scanning control unit 73 drives the X-directional scanning unit 20 to move an incident position of the laser light on the sample 24 located on the stage 60 in the X direction. Accordingly, the X coordinate of a measurement position can be recognized by the X-directional scanning control unit 73 and the stage control unit 72. The X coordinate at a given point of the sample 24 can be thereby obtained.

The Y-directional scanning control unit 74 controls scanning by the Y-directional scanning unit 40. The Y-directional scanning control unit 74 thus controls the operation of the high-speed scanner 13 and the low-speed scanner 16. A deflection angle of the laser light in the Y direction is controlled by the Y-directional scanning control unit 74. The Y-directional scanning control unit 74 drives the Y-directional scanning unit 40 to move an incident position of the laser light on the sample 24 located on the stage 60 in the Y direction. Accordingly, the Y coordinate of a measurement position can be recognized by the Y-directional scanning control unit 74 and the stage control unit 72. The Y coordinate at a given point of the sample 24 can be thereby obtained. Therefore, different points of the sample 24 on the XY plane are represented by different XY coordinates.

The sample 24 is scanned three dimensionally by using the stage control unit 72, the X-directional scanning control unit 73 and the Y-directional scanning control unit 74. A reflected image of reflected light is thereby captured. A measurement position on the sample 24 is represented by the XY coordinates, and a focal position with respect to the sample 24 is represented by the Z coordinate. Thus, measurement is performed a plurality of times by changing the focal position in the Z direction at each measurement position. Specifically, at each measurement position where the focal position is changed, reflected light is detected by the line CCD camera 50.

For example, the high-speed scanner 13 is set in operation with the stage 60, the X-directional scanning unit 20 and the low-speed scanner 16 being set stationary. Then, reflected light for one line is detected by the line CCD camera 50. After that, a focal position is sequentially changed in the Z direction, and reflected light is detected at each focal position. Specifically, when detection of reflected light at a certain focal position ends, the focal position is shifted in the Z direction, and reflected light is detected at that position. Then, when scanning in the Z direction ends, a measurement position is shifted one line by the X-directional scanning unit 20. In the next line also, reflected light is detected by the line CCD camera 50. When scanning in the X direction ends, the stage 60 is driven. Then, the sample 24 is moved in the Y direction, and reflected light is detected in the same manner. In this way, the whole area of the sample is scanned, and reflected light is detected in the same manner. Three-dimensional scanning is thereby conducted. The sequence of scanning, however, is not limited to the above-described sequence.

The intensity of the reflected light detected by the line CCD camera 50 is stored as reflected light data in the reflected light data storage unit 76. The reflected light intensity at each XYZ coordinates is stored in association with the relevant coordinates. Thus, the reflected light intensity is measured at different heights, and the reflected light data is thereby acquired for each coordinates. In this way, a reflected image of each cross section is captured.

The focal position extraction unit 75 extracts a focal position for measuring a Raman spectrum based on the reflected light data. Specifically, the focal position extraction unit 75 detects reflected light at each measurement position and selects a Z coordinate at which a Raman spectrum is to be measured from a plurality of Z coordinates where the reflected light is detected. In this embodiment, reflected light is detected through a confocal optical system. Therefore, the reflected light intensity becomes lower in an area other than the sample surface. The reflected light intensity reaches its maximum when a focal position of the laser light is on the surface of the sample 24. If a focal position of the laser light is deviated from the sample surface, an image is blurred on a light receiving surface of the line CCD camera 50. Thus, the Z coordinate at which the reflected light intensity is maximum is acquired. Then, the Z coordinate is determined as a focal position at which a Raman spectrum is to be measured. Specifically, a focal position at which the reflected light intensity is maximum is extracted, and the extracted focal position is determined as a focal position for measuring a Raman spectrum. Stated differently, the Z coordinates for not measuring a Raman spectrum are determined at each measurement position.

Figure 4:
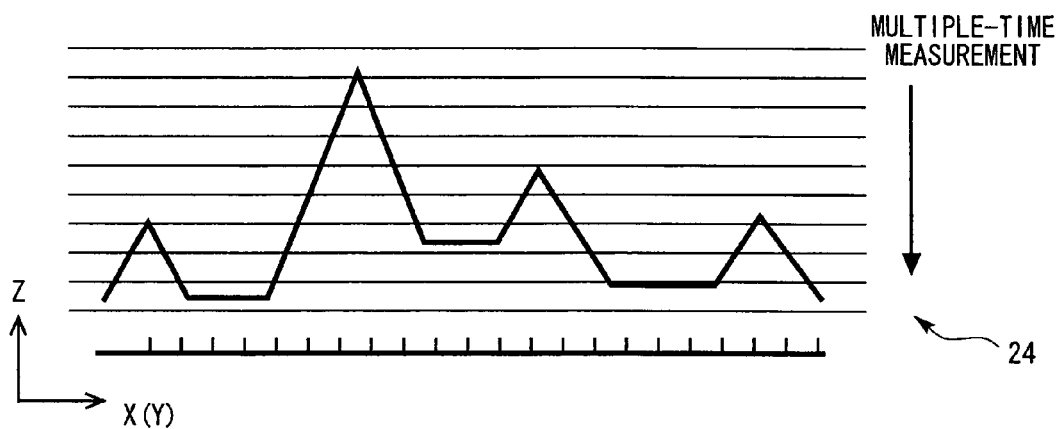
FIG. 4 is a view schematically showing the surface shape of a sample.

In this manner, the focal position extraction unit 75 sequentially acquires a focal position where the reflected light intensity is maximum at the respective XY coordinates. For example, reflected light intensity is measured a plurality of times at the respective XY coordinates as shown in FIG. 4. FIG. 4 is a view schematically showing the surface shape of a sample. Reflected light is detected repeatedly by changing a focal position in the Z direction. Thus, the reflected light intensity is measured at different heights. A two-dimensional reflected image of each cross section is thereby captured. The focal position extraction unit 75 then extracts a focal position where the reflected light intensity is maximum from a plurality of focal positions. Then, the coordinates of the extracted focal position are stored as a surface shape in the surface shape storage unit 77. The surface shape storage unit 77 stores the Z coordinate of the focal position with the maximum reflected light intensity in association with each XY coordinates. If the surface of the sample 24 is uneven, the Z coordinate is different among different measurement positions as shown in FIG. 4.

When the sample 24 is made of materials with different refractive indexes, the reflected light intensity becomes higher on their interface in some cases. The reflected light intensity thus reaches its peak on an interface between materials having different refractive indexes. In this case, a plurality of peaks exist in the reflected light intensity distribution in the Z direction. In such a case, the Z coordinate indicating the sample surface can be determined depending on the Z coordinate at the next measurement position. Specifically, the Z coordinate of the focal position where the surface shape of the sample is smooth at the boundary with the next measurement position is extracted. Then, the extracted focal positions are joined together to thereby form the surface shape of the sample 24.

Figure 5:
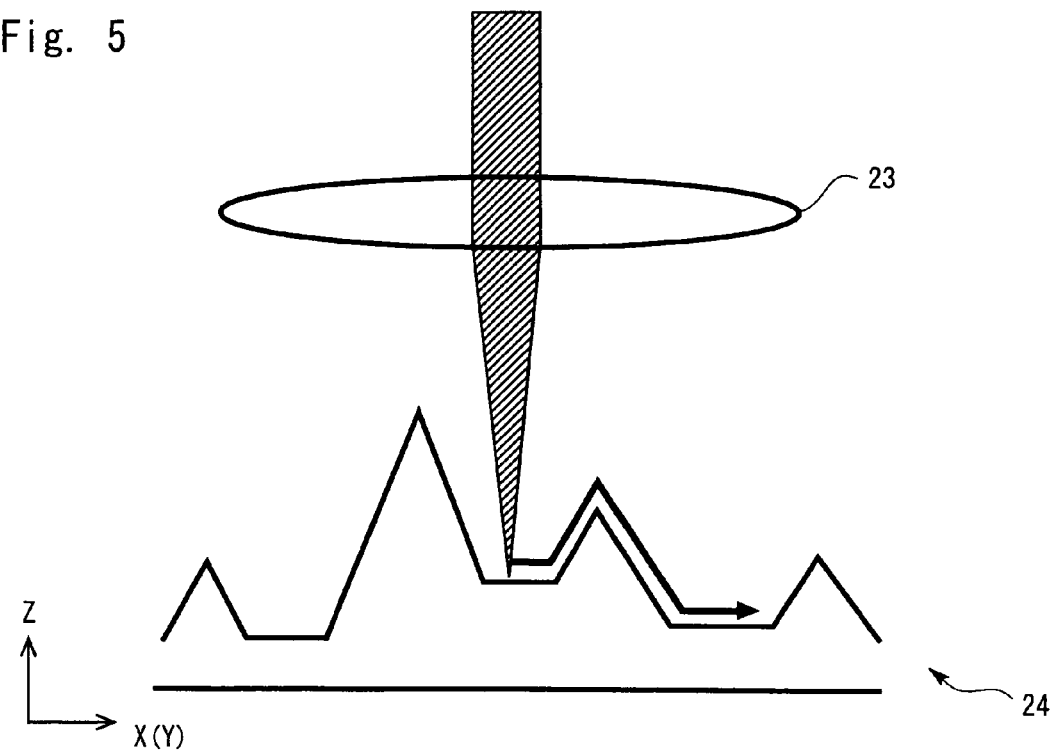
FIG. 5 is a view showing scanning along a sample surface.

After measurement of the surface shape ends, measurement of a Raman spectrum is performed along the surface of the sample 24 as shown in FIG. 5. While moving the measurement position in the XY direction, the stage is driven in the Z direction along the stored surface shape. When measuring a Raman spectrum at the next measurement position, a distance between the sample 24 and the objective lens 23 is changed. In this manner, a measurement point of a Raman spectrum is moved three-dimensionally by referring to the surface shape stored in the surface shape storage unit 77. Specifically, the stage 60 is adjusted in such a way that a focal position falls on the surface of the sample 24. Then, a spectrum is measured with the adjusted focal position. This reduces the number of times of measuring a Raman spectrum, thereby shortening measurement time.

Figure 6:
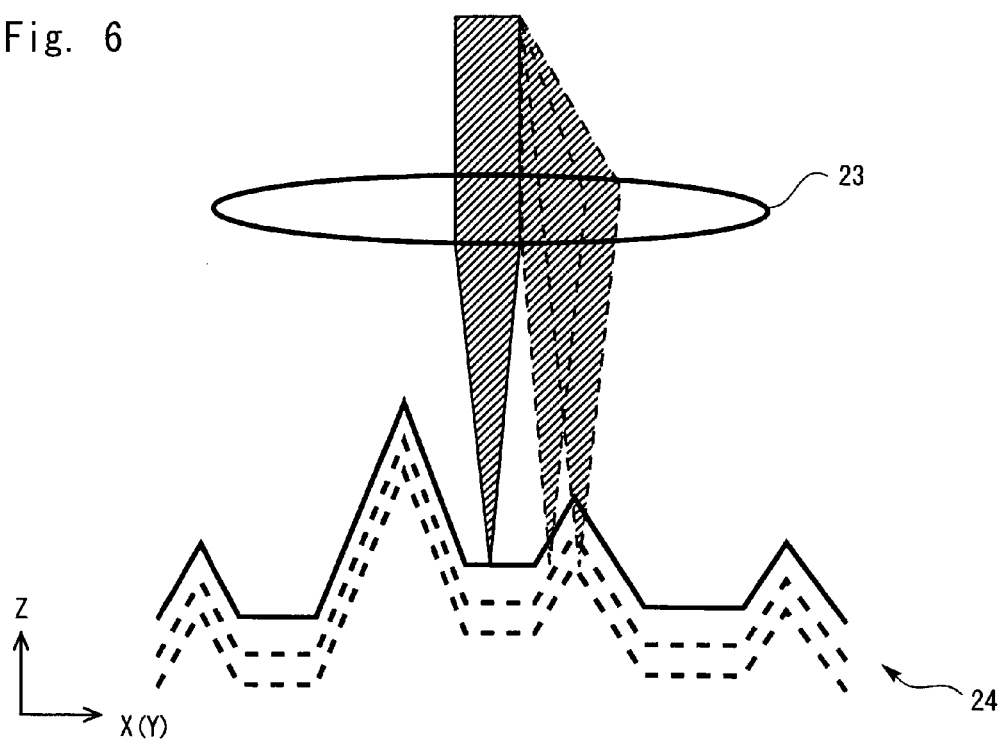
FIG. 6 is a view to describe an example of a scanning method of scanning along a sample surface.
Figure 7:
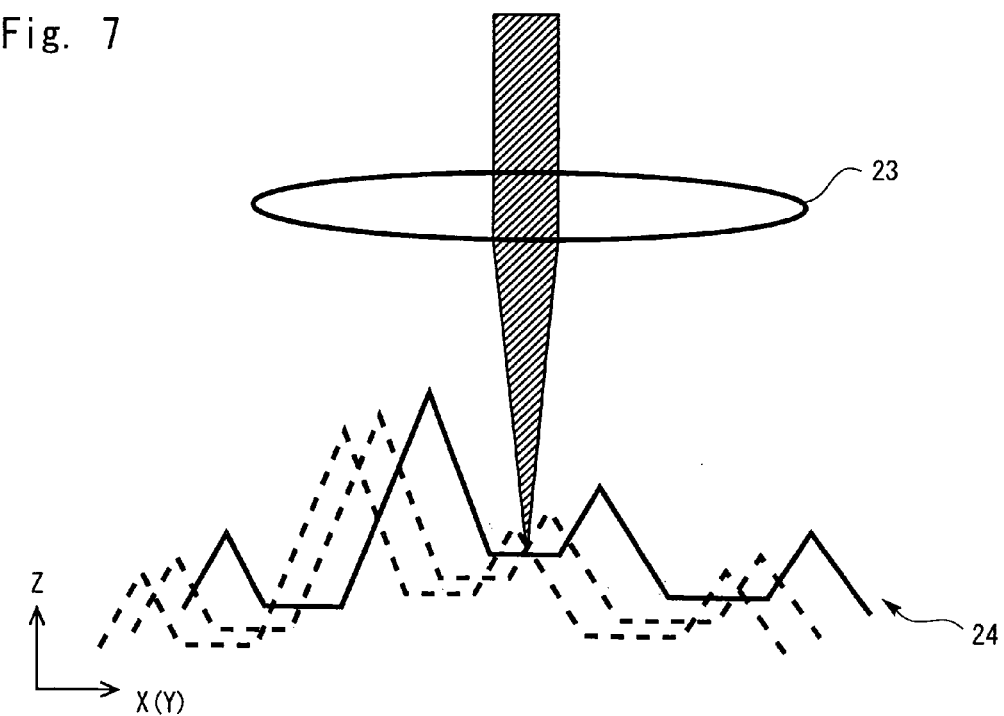
FIG. 7 is a view to describe another example of a scanning method of scanning along a sample surface.

When measuring a Raman spectrum along the sample surface, the laser light is moved in the X direction and the Y direction and further the stage 60 is driven in the Z direction as shown in FIG. 6. Three-dimensional scanning is thus implemented by controlling the low-speed scanner 16, the X-directional scanning unit 20 and the stage 60. It is thereby possible to adjust a distance between the objective lens 23 and the sample 24 at each measurement position. Alternatively, three-dimensional scanning can be implemented by driving the stage 60 only as shown in FIG. 7. In this case, the stage 60 is driven in the XYZ directions, so that a measurement point is moved along the sample surface. A Raman spectrum can be thereby measured along the sample surface. This shortens measurement time. A distance between the objective lens 23 and the sample 24 may be adjusted by moving the objective lens 23 rather than the stage 60.

In this embodiment, a Raman spectrum is measured along the surface shape of the sample 24 by moving the incident light three-dimensionally. This shortens measurement time of a spectrum. It is thereby possible to measure a Raman spectrum over a wide range of the sample 24 in a short time. Even if an observation range of the sample 24 is large, the number of time of measurement at each measurement position can be reduced. There is thus no need for long measurement time. Further, even if wavelength resolution of a Raman spectrum is improved or a spectrum over a wider range is measured, measurement time does not become too long, thus allowing practical observation. For example, observation of a two-dimensional image formed by intensity of Raman scattered light with a given wavelength (frequency) or measurement of a Raman spectrum at a specific point of the sample 24 can be implemented with high resolution.

Further, in this embodiment, a confocal optical system that condenses Raman scattered light is employed. It is thereby possible to improve resolution in the Z direction. Various spectral analyses can be conducted by measuring a spectrum on the sample surface. Further, an advanced analysis can be conducted by displaying an analysis result on a display of the processor.

Further, an optical system for detecting reflected light or fluorescence is configured as a slit confocal optical system. It is thus possible to acquire a reflected image or a fluorescence image at a given height by moving the stage 60 in the Z direction. A tomographic image can be thereby acquired at a high speed and with high resolution. Therefore, three-dimensional observation can be readily implemented.

Although the array photodetector 36 and the line CCD camera 50 are CCD cameras in the above description, they are not limited to CCD cameras. For example, a two-dimensional photodetector in which light receiving pixels are arranged in matrix may be used for spectroscopy. Further, a one-dimensional photodetector in which light receiving pixels are arranged in a line may be used for reflected light detection.

Further, a beam splitter that separates Raman scattered light from laser light is not limited to the edge filter 19. For example, a dichroic mirror that splits light depending on a wavelength may be used as a beam splitter. Further, the X-directional scanning unit 20 is not limited to have a function of deflecting a light beam, and it may have a function of driving the stage 60. In addition, a slit confocal optical system may be configured by using a cylindrical lens or the like instead of the Y-directional scanning unit 40. Specifically, a light converting mechanism that converts light into a linear shape is used instead of the Y-directional scanning unit 40, and a linear optical spot is formed on the sample 24, so that a slit confocal optical system is constructed. It is preferred to use the half mirror 25 and the edge filter 19 exclusively against each other as a light splitting mechanism.

A spectrum measuring method according to an embodiment of the present invention includes steps of applying laser light to the sample 24 through the objective lens 23, detecting reflected light reflected by the sample 24 through the objective lens 23, changing a focal position of the laser light in an optical axis direction, extracting a focal position for spectrum measurement based on a detection result of the reflected light when the focal position of the laser light is changed, adjusting the focal position so as to coincide with the extracted focal position, separating outgoing light from the laser light, the outgoing light exiting from the sample by application of the laser light with the adjusted focal position, and measuring a spectrum of the outgoing light separated from the laser light with a spectroscope. The spectrum measuring method may further include steps of sequentially detecting reflected light from a plurality of measurement positions on the sample by changing an incident position of the laser light with respect to the sample, extracting focal positions at the plurality of measurement positions and measuring a surface shape of the sample, and measuring the spectrum by three-dimensional scanning with the laser light such that the focal position is moved along a surface of the sample.

Second Embodiment

Figure 8:
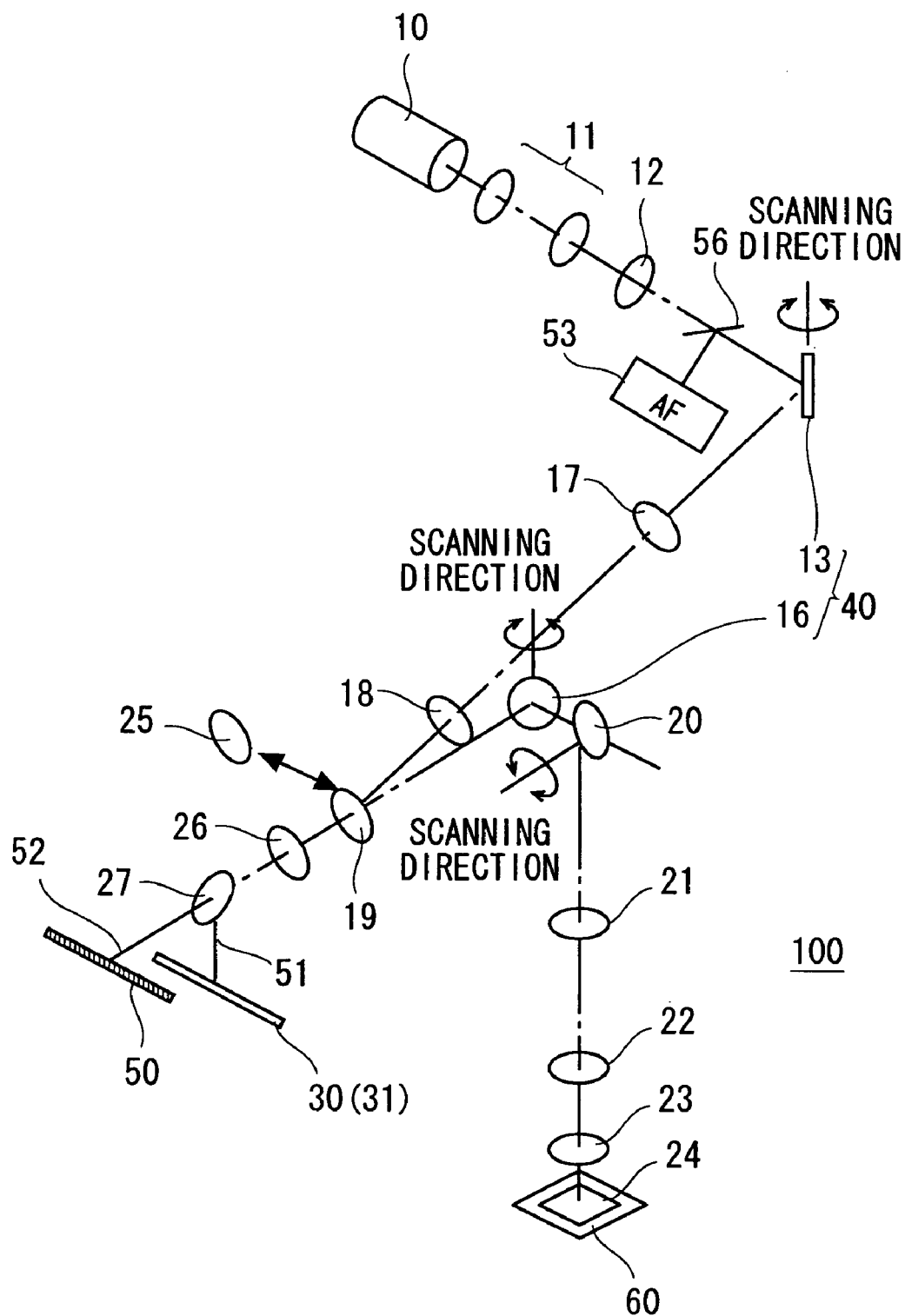
FIG. 8 is a view showing the structure of an optical microscope according to a second embodiment of the present invention.

An optical microscope 100 according to a second embodiment of the present invention is described hereinafter with reference to FIG. 8. FIG. 8 is a view showing an optical system of the optical microscope 100 according to the embodiment. In this embodiment, a beam splitter 56 is placed between the high-speed scanner 13 and the laser line filter 12. Light separated by the beam splitter 56 enters an automatic focus (AF) mechanism 53. The other elements are the same as those described in the first embodiment, and redundant explanation thereof is omitted. In this structure, similar advantages to the first embodiment can be obtained.

In this embodiment, Raman spectrum measurement is conducted while performing tracking of a sample surface by the AF mechanism 53. Automatic focusing (AF) is performed with use of the AF mechanism 53 during Raman spectrum measurement. The AF mechanism 53 includes a quadrant photodiode, a lens, a cylindrical lens or the like. The AF mechanism 53 performs automatic focusing (AF) according to an incident position of reflected light with respect to the quadrant photodiode. Specifically, reflected light is formed into an asymmetric spot shape by the cylindrical lens or the like. Then, a focal position is adjusted by the distribution of reflected light intensity in the quadrant photodiode. In response to an output of the AF mechanism 53, the stage 60 is driven in the Z direction.

Specifically, in the Raman mode, the edge filter 19 and the switching mirror 27 are disposed on the optical path as in the first embodiment. As shown in FIG. 8, the beam splitter 56 is placed between the laser line filter 12 and the high-speed scanner 13. The beam splitter 56 partly transmits and partly reflects incident light. The beam splitter 56 thus transmits or reflects light at a given ratio. The laser light from the laser line filter 12 thus enters the high-speed scanner 13 through the beam splitter 56. Then, the laser light is reflected by the edge filter 19 and incident on the sample 24 just like in the Raman mode according to the first embodiment. Raman scattered light generated in the sample 24 is transmitted through the edge filter 19 and detected by the entrance slit 30 as in the first embodiment. A Raman spectrum is thereby measured.

On the other hand, reflected light from the sample 24 is reflected by the edge filter 19. The reflected light then enters the beam splitter 56 through the relay lens 18, the relay lens 17 and the high-speed scanner 13. The beam splitter 56 reflects part of the incident reflected light toward the AF mechanism 53. The light is thus reflected by the beam splitter 56 and enters the AF mechanism 53. In this manner, the beam splitter 56 functions as a light splitting mechanism that separates the reflected light from the laser light. As described above, the AF mechanism 53 includes the quadrant photodiode and thereby detects reflected light. Based on a detection result in the AF mechanism 53, the stage 60 is driven. A focal position is thereby moved along the sample surface when moving a measurement position in the XY direction. The focal position is thus shifted in the Z direction so as to follow the surface shape of the sample 24. In this way, three-dimensional scanning is conducted in such a way that the focal position follows the surface of the sample 24 with use of the AF mechanism 53.

In this embodiment also, the processor 71 extracts a focal position for spectrum measurement based on a detection result of reflected light when the focal position of the laser light is changed. Then, the focal position is moved three-dimensionally along the surface of the sample 24. Specifically, when moving the measurement position in the XY direction, the height of the focal position is adjusted according to a detection result in the AF mechanism 53. A distance between the objective lens 23 and the sample 24 is thereby adjusted in such a way that the focal position falls on the surface of the sample 24. In this manner, a Raman spectrum is measured by focusing on the sample surface. Measurement of a Raman spectrum is thus conducted while performing tracking such that the focal position falls on the sample surface. This reduces the number of times of measuring a Raman spectrum, thereby shortening measurement time. As described above, in the spectrum measuring method according to the embodiment, a spectrum is measured by conducting scanning three-dimensionally in such a way that the focal position follows the surface shape of the sample 24 based on a detection result of the reflected light. It is thereby possible to measure a spectrum of Raman scattered light from the sample surface in a shorter time.

Third Embodiment

In a third embodiment of the present invention, an optical system capable of conducting capture of a reflected image and measurement of a Raman spectrum simultaneously is employed. In this embodiment, the position of the line CCD camera 50 is different from that in the first embodiment. Further, a beam splitter 55 is placed between the edge filter 19 and the relay lens 18. Reflected light separated by the beam splitter 55 enters the line CCD camera 50 through a focusing lens 54. The other elements are the same as those described in the first embodiment, and redundant explanation thereof is omitted.

In this embodiment, capture of a reflected image and measurement of a Raman spectrum are conducted simultaneously. Therefore, the edge filter 19 and the switching mirror 27 are disposed on the optical path even during capture of a reflected image. Further, the beam splitter 55 that separates reflected light from laser light is disposed on the optical path. The beam splitter 55 partly reflects and partly transmits incident light. The beam splitter 55 thus transmits or reflects light at a given ratio. Part of the laser light from the relay lens 18 is thus transmitted through the beam splitter 55 and enters the edge filter 19. Further, part of the reflected light from the edge filter 19 is reflected by the beam splitter 55 and enters the focusing lens 54. In this manner, the beam splitter 55 functions as a light splitting mechanism that splits light into the laser light and the reflected light. Scanning in the Y direction is conducted by the low-speed scanner 16.

The focusing lens 54 refracts the incident reflected light. An image of the reflected light is thereby formed on the light receiving surface of the line CCD camera 50. The line CCD camera 50 detects the reflected light through a confocal optical system as in the first embodiment. A confocal reflected image can be thereby captured. On the other hand, the spectroscope 31 detects the outgoing light transmitted through the edge filter 19. A Raman spectrum can be thereby measured. In this manner, the optical microscope capable of simultaneously conducting measurement of a Raman spectrum and capture of a reflected image is achieved.

This embodiment eliminates the need for changing the structure of the optical system when switching between capture of a reflected image and measurement of a Raman spectrum. Thus, there is no need to remove the edge filter 19 and the switching mirror 27 from the optical path. It is thereby possible to fix the optical system. This prevents minute displacement of a focal position that occurs upon switching of the optical system. It is thereby possible to achieve highly accurate observation and measurement.

Figure 9:
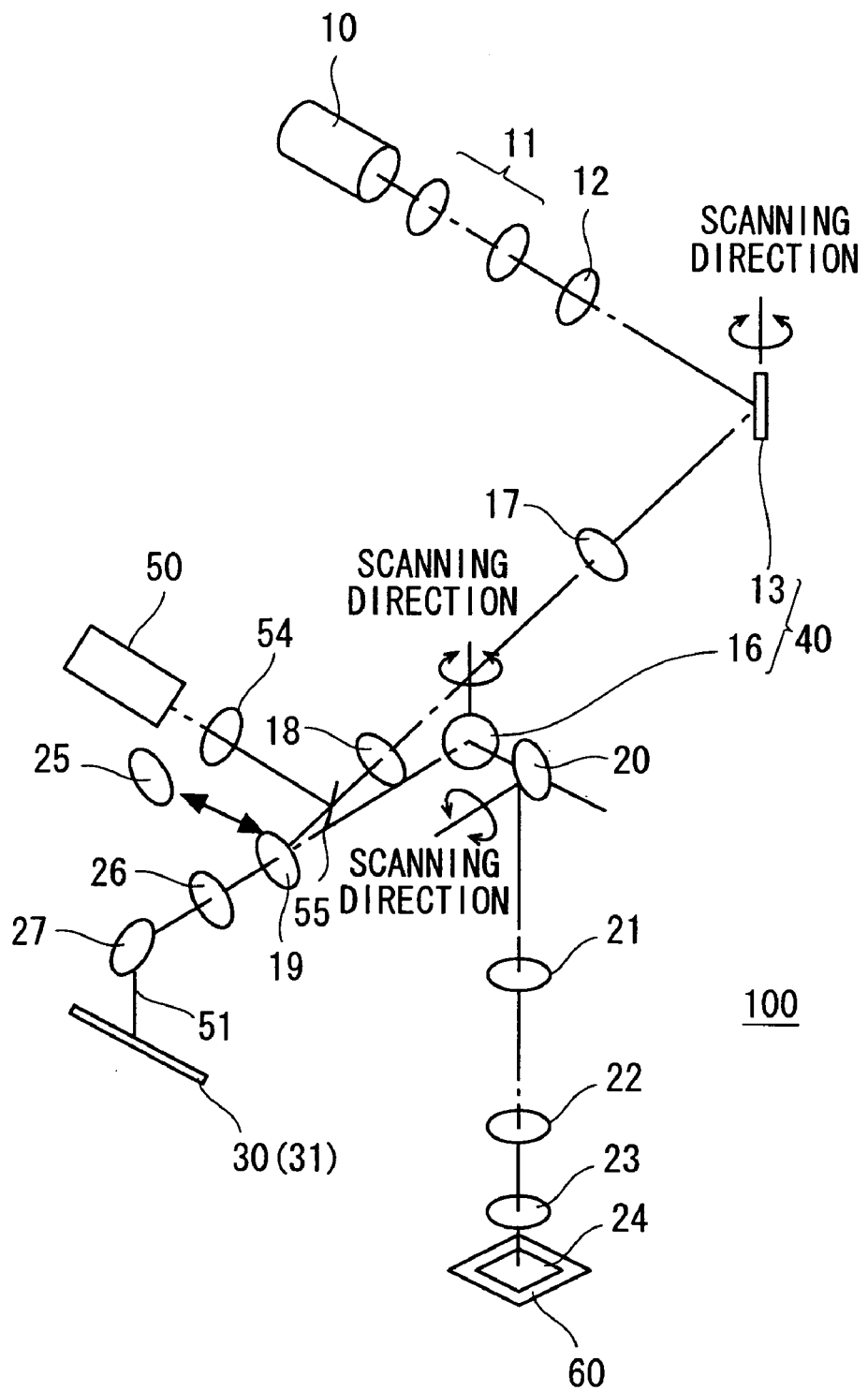
FIG. 9 is a view showing the structure of an optical microscope according to a third embodiment of the present invention.

In the example of FIG. 9, after the edge filter 19 acquires Raman scattered light, the beam splitter 55 separates reflected light from incident light. This reduces a loss of the Raman scattered light, thereby shortening measurement time. The order of separating light, however, is not limited thereto. For example, the layout may be such that after the beam splitter 55 separates outgoing light from incident light, the edge filter 19 separates the outgoing light into reflected light and Raman scattered light. In this case, the edge filter 19 is disposed in the optical path of the outgoing light acquired by the beam splitter 55. The edge filter 19 then splits the outgoing light depending on a wavelength. In FIG. 9, the half mirror 25 may be eliminated. This simplifies the optical system. It is feasible, in this embodiment also, not to simultaneously conduct capture of a reflected image and measurement of a Raman spectrum.

As described above, in this embodiment, in the step of separating the outgoing light from the laser light, the outgoing light having a different wavelength from a wavelength of the laser light is separated from the laser light by a first light splitting mechanism (edge filter 19) that splits light depending on a wavelength, and reflected light reflected by the sample is separated by a second light splitting mechanism (beam splitter 55) after separating the outgoing light from the laser light by the first light splitting mechanism. The reflected light is then detected through a confocal optical system by a photodetector, so that a reflected image of the reflected light from the sample is captured.

The optical microscope according to the first to third embodiment described above is capable of measuring a spectrum of Raman scattered light generated on a sample surface in a short time. Because spectrum measurement is conducted along the surface shape of the sample, measurement is carried out only in a necessary part. Further, a focal position is adjusted onto the surface of the sample. Thus, even in a structure of measuring a spectrum through a confocal optical system, highly accurate measurement can be conducted without degradation of image contrast. Further, the width of the entrance slit 30 can be narrowed, thus improving resolution in the Z direction.

Although a reflected image is captured by using the line confocal optical system in the first to third embodiments described above, an optical system that is used for capture of a reflected image is not limited thereto. For example, a reflected image may be captured by using a confocal optical system with use of a pinhole. Thus, any structure may be employed as long as it captures a reflected image through a confocal optical system. Further, although the structure in which the entrance slit 30 is placed on the incident side of the spectroscope 31 is described above, a structure having a pinhole on the incident surface may be employed. This improves spatial resolution. Furthermore, the first to third embodiments can be combined as appropriate. For example, the AF mechanism 53 or the like may be added to the optical microscope according to the third embodiment.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A spectrum measuring method, comprising:
   applying laser light to a sample through the an objective lens;
   detecting reflected light reflected by the sample through the objective lens;
   changing a focal position of the laser light in an optical axis direction;
   extracting a focal position for spectrum measurement from a plurality of focal positions by determining at least one focal position for not measuring spectrum from the plurality of focal positions based on a detection result of the reflected light when the focal position of the laser light is changed;
   adjusting the focal position to coincide with the extracted focal position in the optical axis direction;
   separating outgoing light from the laser light, the outgoing light exiting from the sample by application of the laser light with the adjusted focal position; and
   measuring a spectrum of the outgoing light separated from the laser light with a spectroscope.

2. The spectrum measuring method according to claim 1, further comprising:
   sequentially detecting reflected light from a plurality of measurement positions on the sample by changing an incident position of the laser light with respect to the sample;
   extracting the focal position at each of the plurality of measurement positions and measuring a surface shape of the sample; and
   measuring the spectrum by conducting three-dimensional scanning with the laser light such that the focal position is moved along a surface of the sample.

3. The spectrum measuring method according to claim 1, further comprising:
   measuring the spectrum by conducting three-dimensional scanning such that the focal position follows a surface of the sample based on a detection result of the reflected light.

4. The spectrum measuring method according to Claim 1, further comprising:
   changing an incident position of the laser light with respect to the sample by a first scanning mechanism that conducts scanning with the laser light in a first direction; and
   changing an incident position of the laser light with respect to the sample by a second scanning mechanism that conducts scanning with the laser light in a second direction orthogonal to the first direction, wherein
   the outgoing light from the sample is descanned by the first scanning mechanism and the second scanning mechanism and enters the spectroscope.

5. The spectrum measuring method according to claim 4, further comprising:
   measuring a surface shape of the sample by changing the incident position of the laser light with respect to the sample by scanning of the second scanning mechanism and a third scanning mechanism, and
   measuring the spectrum of the outgoing light along the surface shape of the sample after measuring the surface shape,
   wherein the third scanning mechanisms conduct scanning with the laser light in the first direction and does not descan the outgoing light.

6. The spectrum measuring method according to claim 5, wherein the second and the third scanning mechanism change the incident position of the laser light with respect to the sample, and
   wherein a line charge-coupled device (CCD) camera detects the reflected light reflected by the sample through the objective lens to measure the surface shape of the sample.

7. The spectrum measuring method according to claim 5, wherein the third scanner comprises a resonant galvanometer scanner.

8. The spectrum measuring method according to claim 1, wherein the reflected light is detected through a confocal optical system by a photodetector.

9. The spectrum measuring method according to claim 8, wherein the separating the outgoing light from the laser light comprises:
   separating the outgoing light, comprising a wavelength different from a wavelength of the laser light, from the laser light by a first light splitting mechanism that separates light depending on a wavelength; and
   separating reflected light reflected by the sample by a second light splitting mechanism after separating the outgoing light from the laser light by the first light splitting mechanism.

10. The spectrum measuring method according to claim 9, wherein the second light splitting mechanism separates the reflected light without depending on the wavelength, and
    wherein the second light splitting mechanism is located closer to a laser light source emitting the laser light than the first light splitting mechanism in an optical path.

11. An optical microscope, comprising:
    a laser light source;
    an objective lens that condenses light from the laser light source on a sample;
    a first light splitting mechanism that separates outgoing light from incident light incident on the sample from the laser light source, the outgoing light exiting from the sample toward the objective lens;
    a photodetector that detects reflected light reflected by the sample through the objective lens;
    a focal position changing mechanism that changes a focal position of the laser light along an optical axis;
    an extracting mechanism that extracts a focal position for spectrum measurement from a plurality of focal positions by determinine at least one focal position for not measuring spectrum from the plurality of focal positions based on a detection result of the photodetector when the focal position is changed along the optical axis; and a spectroscope that measures a spectrum of the outgoing light separated by the first light splitting mechanism at the focal position extracted by the extracting mechanism.

12. The optical microscope according to claim 1, wherein reflected light is sequentially detected from a plurality of measurement positions on the sample by changing an incident position of the laser light with respect to the sample, wherein the focal position at each of the plurality of measurement positions is extracted, and a surface shape of the sample is measured, and wherein the spectrum is measured by conducting three-dimensional scanning with the laser light such that the focal position is moved along a surface of the sample.

13. The optical microscope according to claim 11, further comprising:

an automatic focus mechanism that conducts scanning such that the focal position follows a surface of the sample based on a detection result of the reflected light, wherein the spectrum measurement is performed following the surface of the sample by the automatic focus mechanism.

14. The optical microscope according to claim 11, further comprising:

a first scanning mechanism that conducts scanning with the laser light in a first direction and changes an incident position of the laser light with respect to the sample; and a second scanning mechanism that conducts scanning with the laser light in a second direction orthogonal to the first direction and changes an incident position of the laser light with respect to the sample, wherein the outgoing light from the sample is descanned by the first scanning mechanism and the second scanning mechanism and enters the spectroscope.

15. The optical microscope according to claim 14, further comprising a third scanning mechanism that conducts scanning with the laser light in a first direction and does not descan the outgoing light.

16. The optical microscope according to claim 15, wherein the third scanning mechanism comprises a resonant galvanometer scanner.

17. The optical microscope according to claim 11, wherein the photodetector detects the reflected light through a confocal optical system.

18. The optical microscope according to claim 17, further comprising a second light splitting mechanism that separates reflected light reflected by the sample from laser light incident on the sample after the first light splitting mechanism makes separation, and wherein the first light splitting mechanism acquires the outgoing light having a wavelength different from a wavelength of the laser light, depending on a wavelength.

19. The optical microscope according to claim 18, wherein the second light splitting mechanism separates the reflected light from the laser light without depending on the wavelength, and wherein the second light splitting mechanism is located closer to the laser light source than the first light splitting mechanism in an optical path.

20. An optical microscope, comprising:

a laser light source;

an objective lens that condenses light from the laser light source on a sample;

a first light splitting mechanism that separates light depending on a wavelength and acquires outgoing light having a wavelength different from a wavelength of laser light from outgoing light exiting from the sample toward the objective lens;

a spectroscope that measures a spectrum of the outgoing light separated by the first light splitting mechanism;

a second light splitting mechanism that separates reflected light reflected by the sample from the laser light;

a photodetector that detects the reflected light reflected by the sample through a confocal optical system to capture a reflected light image of the reflected light from the sample: and an extracting mechanism that extracts a focal position for spectrum measurement from a plurality of focal positions by determining at least one focal position for not measuring spectrum from the plurality of focal positions based on a detection result of the photodetector when the focal position is changed along the optical axis.

* * * * *